(12) United States Patent
Collins

(10) Patent No.: US 7,428,845 B1
(45) Date of Patent: Sep. 30, 2008

(54) COMPRESSION GAUGE

(76) Inventor: Bobby Collins, 825 Holiday Ct., Kenner, LA (US) 70065

( * ) Notice: Subject to any disclaimer, the term of this patent is extended or adjusted under 35 U.S.C. 154(b) by 66 days.

(21) Appl. No.: 11/582,708

(22) Filed: Oct. 18, 2006

(51) Int. Cl.
*G01N 3/10* (2006.01)
(52) U.S. Cl. ........................................ 73/825
(58) Field of Classification Search ............ 73/818–825
See application file for complete search history.

(56) References Cited

U.S. PATENT DOCUMENTS

| | | | | | |
|---|---|---|---|---|---|
| 4,044,834 | A | * | 8/1977 | Perkins | 166/370 |
| 4,322,193 | A | * | 3/1982 | Stahl | 411/11 |
| 4,558,599 | A | * | 12/1985 | Sachs | 73/761 |
| 6,925,807 | B2 | * | 8/2005 | Jones et al. | 60/721 |
| 7,216,531 | B2 | * | 5/2007 | Young et al. | 73/116 |

* cited by examiner

*Primary Examiner*—Max Noori
(74) *Attorney, Agent, or Firm*—Roy, Kiesel, Keegan & DeNicola

(57) ABSTRACT

A compression gauge for measuring the compression applied to a test bolt. The compression gauge includes a passive hydraulic cylinder and a piston slidably disposed within the cylinder. The piston and the cylinder define an hydraulic chamber. A threaded test bolt passes through the piston and cylinder to engage a female receiver on the opposite side of the compression gauge. Tightening the test bolt will cause the bolt to compress the piston and cylinder which will pressurize the hydraulic chamber. A pressure gauge measures the pressure achieved in the hydraulic chamber. This pressure can be easily converted to compressive force. When a hydraulic wrench is used to tighten the test bolt, the wrench can be set to apply the same amount of torque to a workpiece bolt and thus apply the desired amount of compression to the workpiece bolt.

6 Claims, 6 Drawing Sheets

COMPRESSION GAUGE

BACKGROUND OF THE INVENTION

1. Field of the Invention

The invention relates to compression gauges in general and to compression gauges for use in combination with hydraulic wrenches in particular.

2. Prior Art

Hydraulic wrenches are well known in the art. Examples can be seen in U.S. Pat. Nos. 6,553,873 and 6,408,720, which are hereby incorporated by reference in their entirety. Such wrenches are frequently used to apply significant torque to large bolts such as the ones used to connect riser joints used in offshore petroleum structures. In designing these joints, engineers determine a compression that the bolts must exert in order to secure the joint. It is important that a degree of compression close to the desired level is applied. Generally, most design parameters call for tolerances within about ten percent. If insufficient compression is obtained, the riser may be able to flex excessively at the joint, which can lead to bolt fatigue which in turn can lead to joint failure. The compression exerted by a bolt is a direct result of the tension placed in the bolt. Generally, the design specifications are such that the bolts should be subjected to no more than about sixty percent of the tension necessary for the bolt to fail. If excess tension is placed on the bolt, the bolt may be excessively distorted which can result in the failure of the bolt under the operational load applied to the riser. Failure of these bolts can lead to joint failure and loss of the riser. Thus, it is important that the correct amount of compression be obtained.

Design engineers often convert the desired compression, typically measured in pounds of force, into torque to be applied by the wrench, typically measured in foot-pounds. This creates problems because the torque exerted by the wrenches is dependent upon conditions that can vary such as the rig hydraulics and the dimensions of the wrench being used to tighten the bolt. Moreover, tool operators usually cannot directly assess how much torque they are applying. Rather, they can tell the amount of hydraulic pressure (in pounds per square inch or psi) they are applying to the wrench. The hydraulic pressure must be converted to torque which is itself a conversion from compression. Thus, two steps are required to convert the measurable quantity, pressure, into the desired quantity, compression. While this is usually done beforehand, it still creates an opportunity for error that can have significant adverse consequences. Therefore, a device meeting the following objectives is desired.

OBJECTS OF THE INVENTION

It is an object of the invention to allow a predetermined compressive load to be applied to a bolt.

It is another object of the invention to allow a hydraulic wrench to be calibrated to apply the desired amount of compressive load to a bolt.

It is still another object of the invention to allow the compression applied by the wrench to each bolt to be measured.

It is yet another object of the invention to allow the compression applied by the wrench to each bolt to be recorded.

SUMMARY OF THE INVENTION

A compression gauge is disclosed. As noted above, operators of hydraulic wrenches will typically be given a desired torque to be applied to each bolt. However, the torque figure is usually converted from the desired compression designers wish the bolts to apply. The present device allows a desired compressive load to be achieved. It comprises a fluid filled cylinder mounted securely in a stand. A piston is slidably disposed within the cylinder. A threaded bolt is disposed within this piston so that tightening the bolt into a threaded receiver positioned below the piston will pull the piston into the cylinder, compressing the fluid. The pressure exerted on the fluid can be measured, typically in pounds per square inch. This pressure can be converted into pounds of force, which is the compressive force exerted by the bolt. Once the desired pressure is obtained, the torque control valve (or pressure cut-off valve) on the wrench can be set to open at the hydraulic line pressure that was needed to generate the desired compressive force in the bolt. This will allow the operator to reproduce the desired compressive force by tightening the bolts until the torque control valve opens. Operating the wrench until the pressure cut-off valve opens will ensure that the desired compression is obtained. When the pressure cut-off valve opens, further operation of the wrench will not be possible, thereby preventing over-tightening of the bolt. Proper operation of the tool can be monitored by recording the line pressure reached for each bolt.

DETAILED DESCRIPTION OF THE BEST MODE

Figure 1:
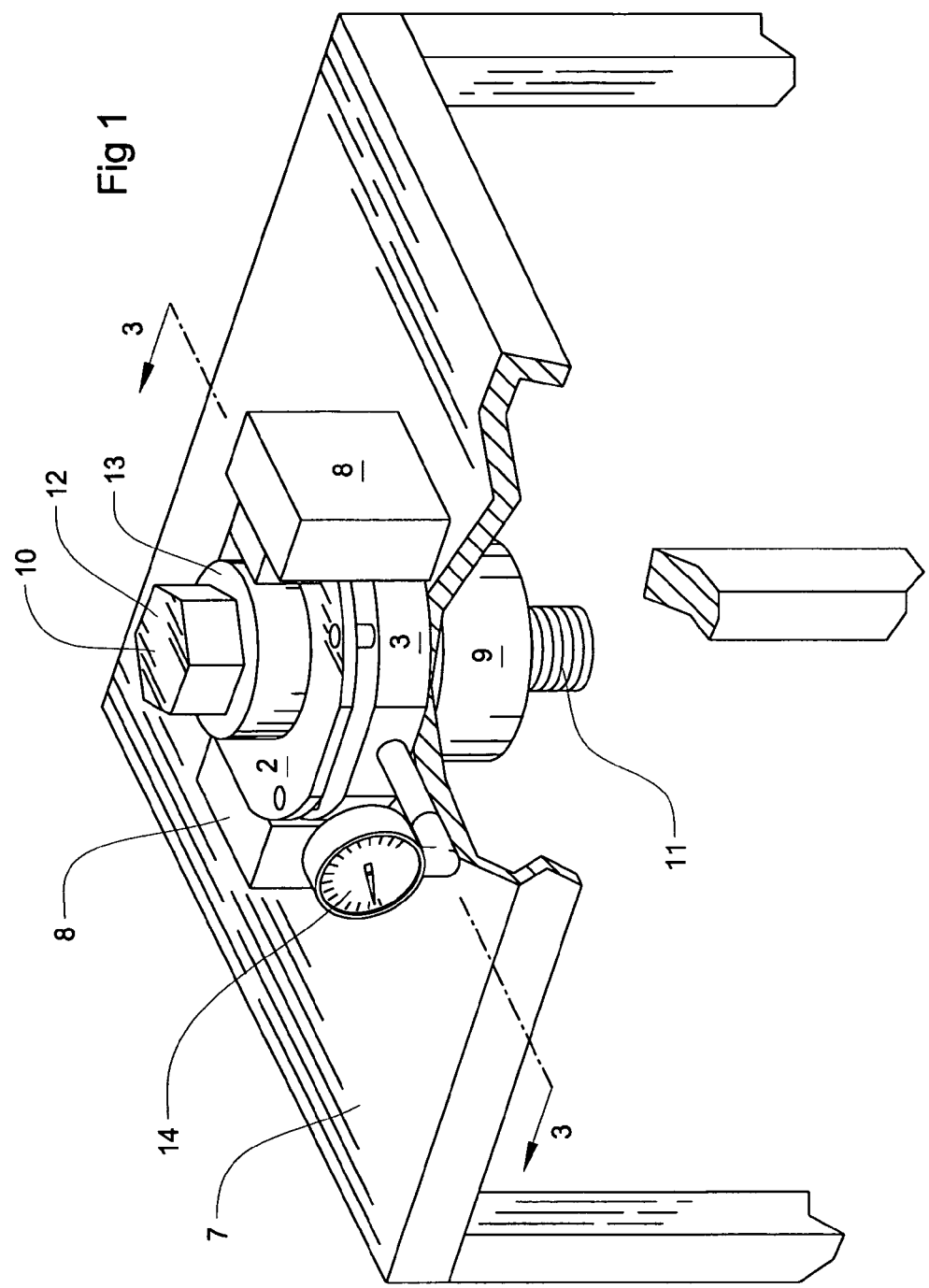
FIG. 1 is a top perspective view, shown in partial cut-away, of a preferred embodiment of the compression gauge and stand.
Figure 2:
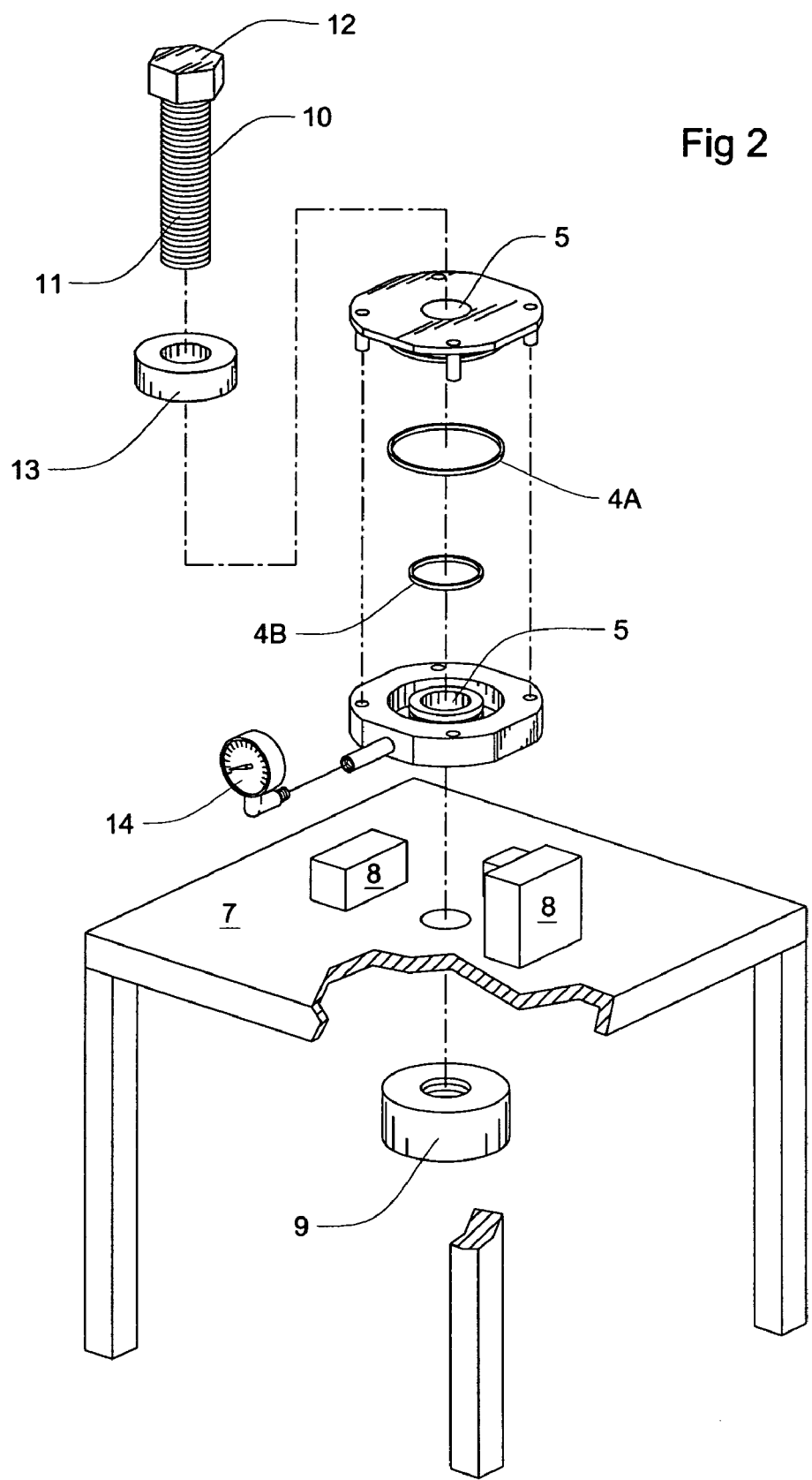
FIG. 2 is an exploded perspective view of a preferred embodiment of the compression gauge and stand, with the stand shown in partial cut-away.
Figure 3:
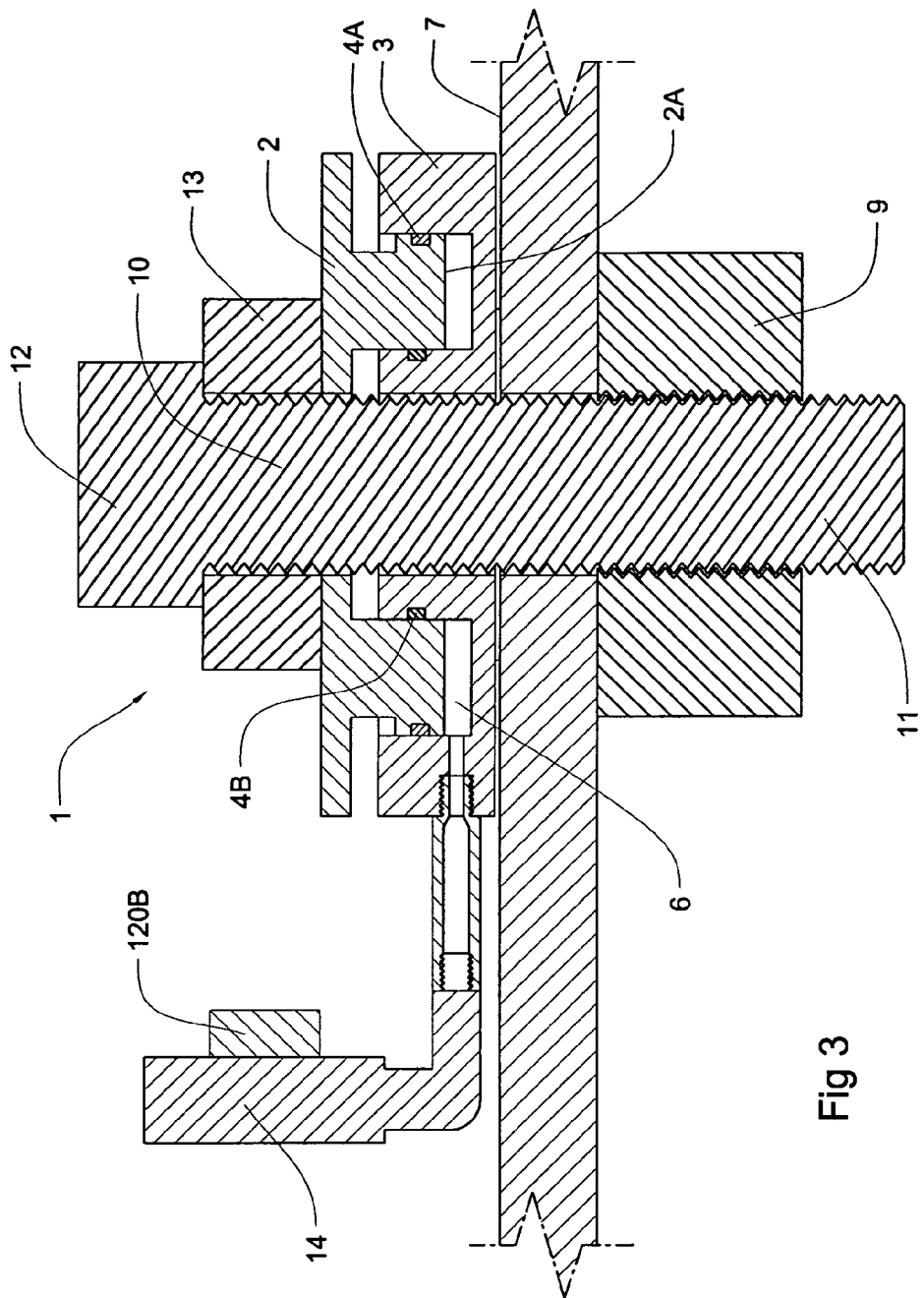
FIG. 3 is a cross-sectional view of a preferred embodiment of the compression gauge.
Figure 4:
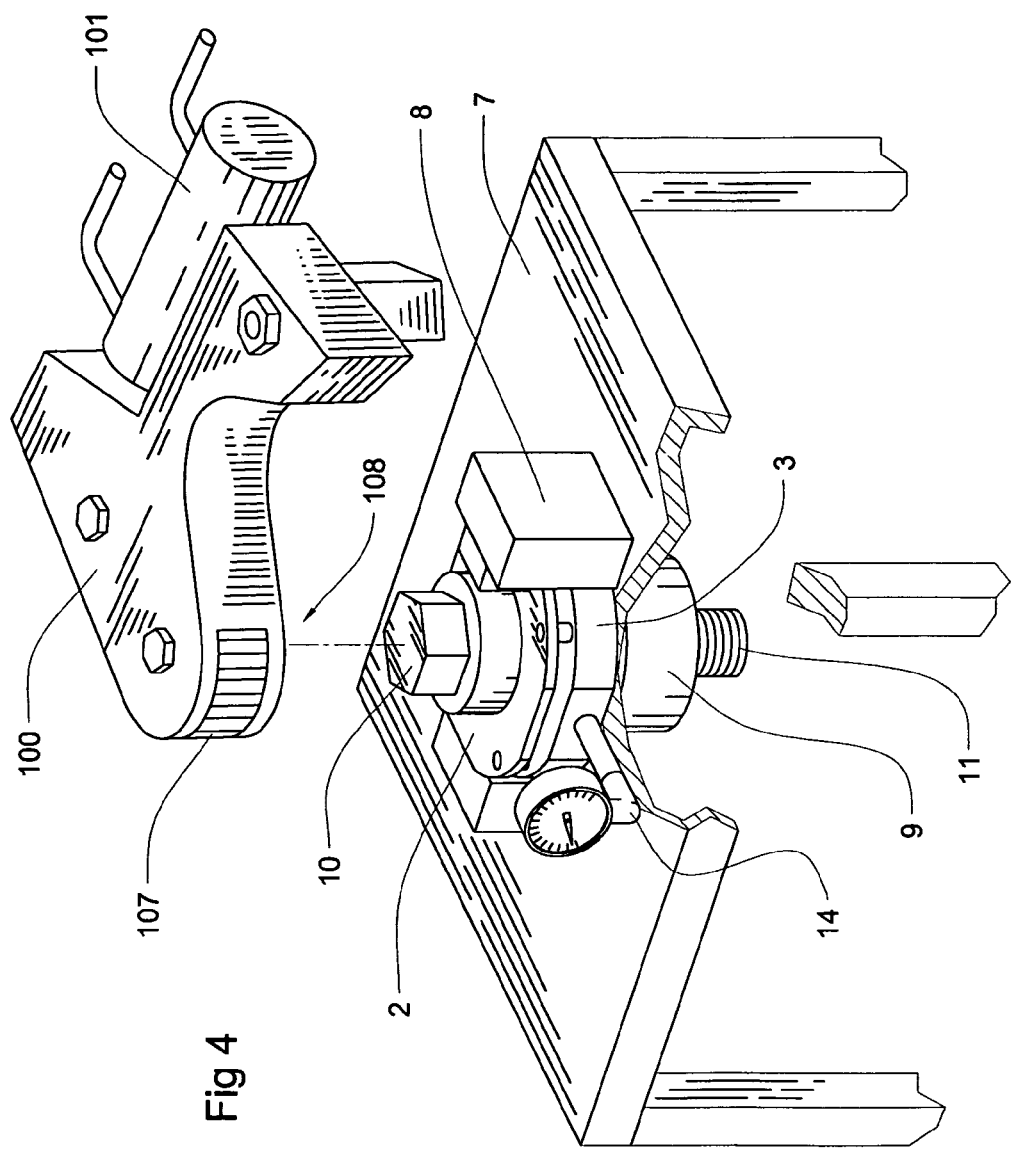
FIG. 4 is a perspective view of an hydraulic wrench prior to its being used to tighten a bolt in a preferred embodiment of the compression gauge and stand.
Figure 5:
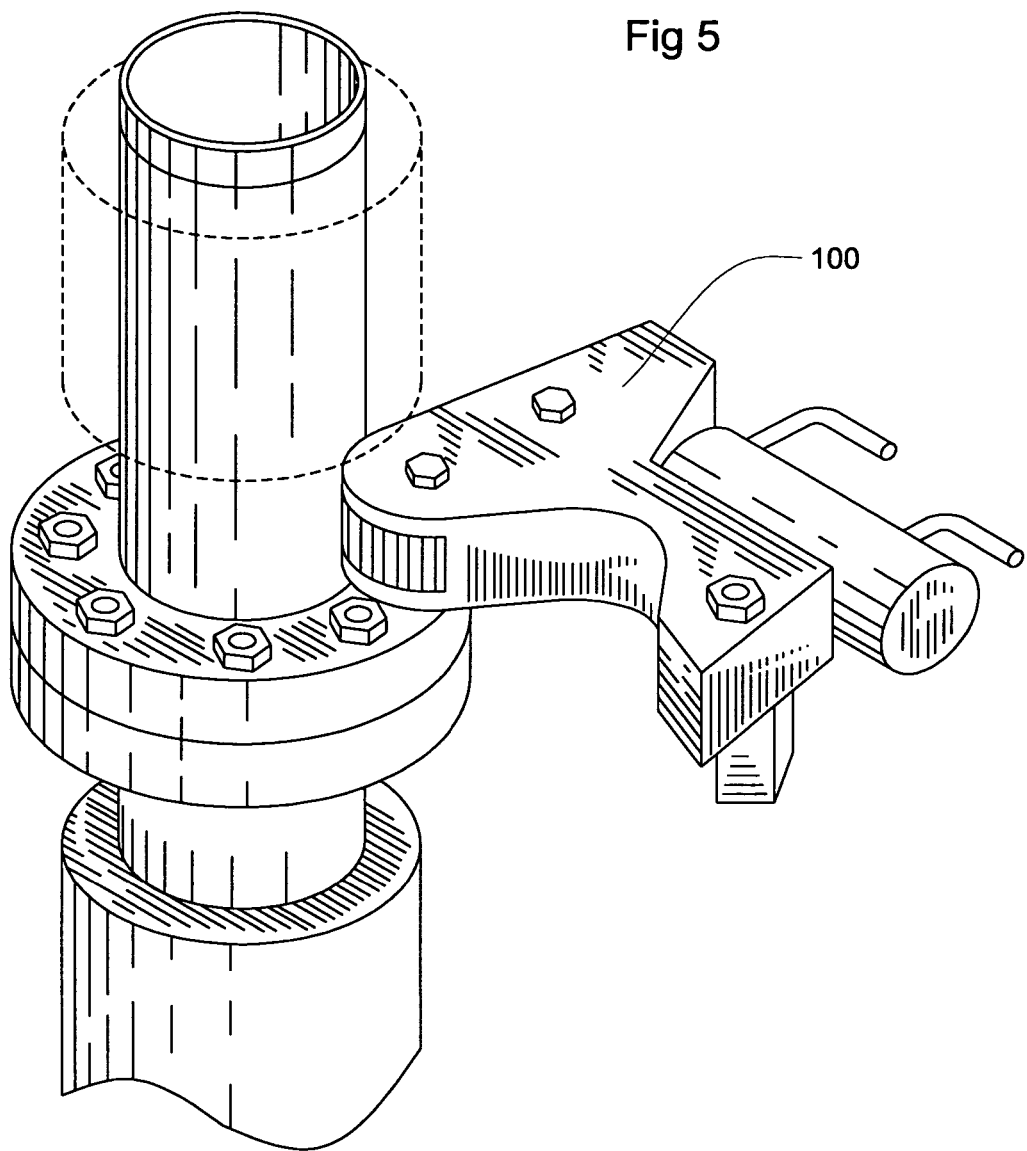
FIG. 5 is a perspective view of an hydraulic wrench being used to tighten a riser.
Figure 6:
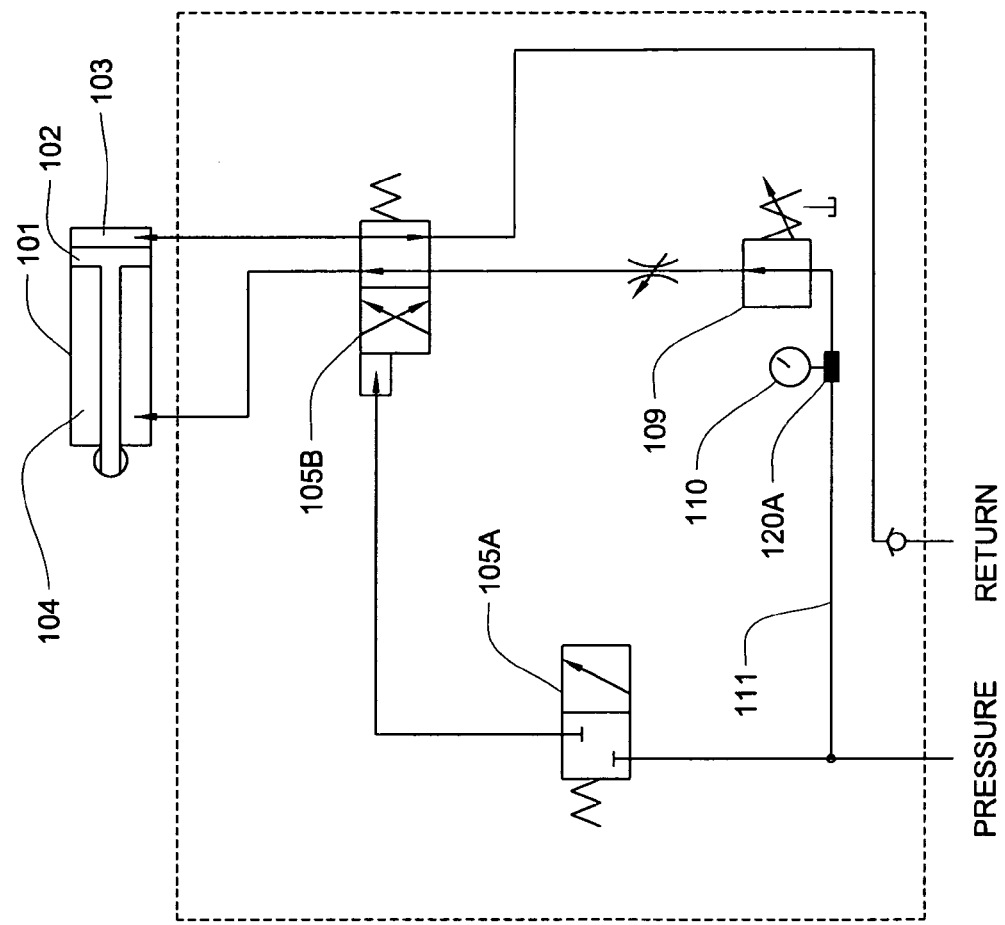
FIG. 6 is a schematic view of the hydraulics of an hydraulic wrench illustrating the torque control valve and a transducer used to monitor the compression applied to bolts by the hydraulic wrench.

A compression gauge 1 is disclosed. Compression gauge 1 comprises a piston 2 slidably disposed within a cylinder 3. A pair of gaskets 4A, 4B are preferably provided between piston 2 and cylinder 3 to facilitate a fluid tight seal between piston 2 and cylinder 3. Piston 2 and cylinder 3 are preferably annually disposed about a hollow central core 5. Piston 2 and cylinder 3 define a hydraulic chamber 6 in the space between them. In the preferred embodiment, hydraulic chamber 6 is generally shaped like a ring or a donut, and filled with a hydraulic fluid.

Compression gauge 1 is preferably mounted to a stand 7. Stand 7 is preferably provided with blocks 8 which will secure gauge 1, preventing it from rotating under high torque loads. Compression gauge 1 may have a hexagonal or octagonal shape to facilitate engagement with blocks 8. Blocks 8 will also provide a convenient surface against which a wrench 100 (discussed below) may react.

A threaded female receiver 9 is positioned below compression gauge 1. Receiver 9 should be aligned with hollow central core 5. Receiver 9 may be attached directly to or formed integrally with cylinder 3. Alternatively, receiver 9 may be attached to or formed integrally with stand 7. If stand 7 is positioned between receiver 9 and cylinder 3, stand 7 should contain an aperture to allow receiver 9 to communicate with central core 5.

A bolt 10, having a threaded body 11 and a head 12 is positioned so that body 11 passes through central core 5. A washer 13 is preferably positioned between the upper surface of piston 2 and bolt head 12, though washer 13 can be omitted if desired. Washer 13 may simply rest on the upper surface of piston 2. Alternatively, washer 13 may be attached to or formed integrally with the upper surface of piston 2.

Bolt 10 will engage threaded receiver 9 such that turning bolt 10 in a tightening (usually clockwise) direction will pull bolt 10 into threaded receiver 9. Thus, tightening bolt 10 will cause bolt 10 to press on washer 13 which will push piston 2 toward cylinder 3.

As piston 2 moves toward cylinder 3, hydraulic chamber 6 will be compressed. This will pressurize the hydraulic fluid within hydraulic chamber 6. A pressure gauge 14 is provided so that the pressure obtained in hydraulic chamber 6 may be observed.

By determining the pressure in hydraulic chamber 6, the compressive load on bolt 10 may be determined. All of the pressure on the fluid in hydraulic chamber 6 is being applied through piston 2. Thus, the pressure in hydraulic chamber 6 is a function of the force applied to bolt 10 and the surface area of the lower surface 2A of piston 2. For example, if the lower surface of piston 2A has a surface area of 50 square inches and pressure gauge 14 reads 10,000 psi, then bolt 10 is applying 500,000 pounds of compressive force to compression gauge 1 (10,000 psi×50 in$^2$=500,000 lbs).

In the preferred embodiment, bolt 10 will be tightened in compression gauge 1 with a hydraulic torque wrench 100. Wrench 100 generally comprises an active hydraulic cylinder 101 containing a piston 102. Cylinder 101 has an extension side 103 and a retraction side 104. When extension side 103 is pressurized, piston 102 will extend. When retraction side 104 is pressurized, piston 102 will retract. A pair of valves 105A and 105B are provided for directing hydraulic fluid to retraction side 104 or extension side 103 of cylinder 101 as desired by the operator.

Piston 102 preferably drives or engages a pawl when piston 102 is extended. The pawl will engage ratchet teeth 107 on a socket 108 in wrench 100. Socket 108 is configured to engage head 12 of bolt 10 or, in some instances, a nut that engages bolt 10. Depending on how wrench 100 is configured, socket 108 can tighten or loosen bolt 10 by extending piston 102.

Very high torques can be applied to bolt 10 with hydraulic wrench 100. As stated above, one of the objects of the present invention is to ensure that a wrench 100 is able to apply a uniform and predetermined degree of compression to each bolt 10 tightened. This can be accomplished using the torque control valve 109, present in most hydraulic wrenches 100, in conjunction with compression gauge 1. A torque control valve 109 can be set to open when the hydraulic line pressure reaches a predetermined level. When this valve 109 opens, piston 102 cannot be extended further and additional tightening is not possible. In this case, wrench 100 is said to have "torqued out."

In the preferred application of the present invention, hydraulic wrench 100 will be used to tighten bolt 10 in compression gauge 1. Bolt 10 will preferably be identical to the workpiece bolts that will be used to make up a riser or other object under construction. Bolt 10 will be tightened in compression gauge 1 until the amount of compressive load desired in the object under construction is obtained. That is, if 500,000 lbs of compressive force is desired, bolt 10 will be tightened until pressure gauge 14 reads 10,000 psi, as discussed above.

In one embodiment, the torque control valve 109 in hydraulic wrench 100 is opened slowly until the desired pressure is obtained in compression gauge 1. That is, more and more pressure is allowed to build up in the line feeding wrench 100 until bolt 10 is tightened sufficiently to achieve the desired pressure in compression gauge 1. Torque control valve 109 will be locked in place at this setting, so that wrench 100 will torque out when this pressure is reached during operation. It will be appreciated that in this application, the user does not need to know what the pressure in the line feeding wrench 100 is or at what pressure torque control valve 109 is set. Rather, he is simply opening torque control valve 109 until the desired pressure in compression gauge 1 is reached, and then locking torque control valve 109 at that setting.

In a second embodiment, a second pressure gauge 110 is provided to measure the pressure in the hydraulic line 111 feeding cylinder 101. In this configuration, torque control valve 109 will initially be opened sufficiently to allow wrench 100 to tighten bolt 10 until compression gauge reaches the desired pressure—i.e., torque control valve may be fully open. When the desired pressure on gauge 14 is reached, the operator will observe the pressure recorded on pressure gauge 110. He can then set torque control valve 109 to open at the pressure observed on gauge 110. Thus, for example, if pressure gauge 110 shows a line pressure of 1700 psi when gauge 14 shows that compression gauge 1 has reached the desired 10,000 psi, the operator will set torque control valve 109 to open at 1700 psi.

It will be observed that the second application, setting the torque control valve from a measured pressure in the line feeding wrench 100, requires the torque control valve 109 and gauge 110 to be synchronized. That is not the case with the first application, opening torque control valve 109 until the desired pressure is obtained on compression gauge 1. Even when pressure gauge 110 is provided in the first application, it need not be synchronized with torque control valve 109. Rather, torque control valve 109 will necessarily be set correctly because its opening is directly tied to the pressure observed in compression gauge 1. In the first application, pressure gauge 110 only provides a reading of the pressure in the line feeding wrench 100. Nothing is set by this reading.

After torque control valve 109 is set, wrench 100 will then be moved from compression gauge 1 to the workpiece where it will be used to tighten bolts identical to bolt 10. By tightening these workpiece bolts until torque control valve 109 opens at the preset pressure—that is, tightening until the wrench torques out—the operator can be sure that the wrench will have applied the same amount of torque, and thus applied the same compressive load, to the bolts used in the workpiece as was applied to bolt 10 in the compression gauge.

A transducer/transponder 120A may be provided in conjunction with pressure gauge 110. Transducer/transponder 120A can be used to convert pressure readings to a machine readable digital or analog signal and then transmit that signal to a recording device such as a computer. This will allow the degree to which each bolt is tightened to be observed and recorded. This will allow managers on site to observe that each bolt is tightened to the desired degree and to correct any errors that may occur in a timely manner. Moreover, it will create a record that will show exactly how each bolt was tightened, should this become an issue later. This latter function could be accomplished by providing each wrench with a computer memory device that records the pressure obtained on each bolt. A second transducer/transponder 120B may also be provided in conjunction with pressure gauge 14 to allow the pressure obtained in compression gauge 1 to be monitored and recorded.

In order to provide visual confirmation to the operator that the desired pressure has been reached, wrench 100 may be provided with visual indicia such as a light that comes on or changes color when the desired pressure is reached in the line feeding wrench 100.

One potential for operator error is present when piston 102 of hydraulic wrench 100 is fully extended. When this occurs, the operator should stop applying pressure to cylinder 101, retract piston 102, and then re-extend piston 102. However, it will be appreciated that if the operator continues to apply pressure to cylinder 101 when piston 102 is fully extended, the pressure in the line feeding wrench 100 will continue to rise. This can cause torque control valve 109 to open even though the desired amount of compression has not been applied to the bolt being tightened. A solution to this problem is to provide a valve that opens when piston 102 is fully extended, thereby preventing further build up of pressure. This will prevent wrench 100 from "torquing out" when it is not applying torque to the bolt being tightened. An example of such a valve, a piston bleed valve, is discussed in detail in U.S. patent application Ser. No. 10/877,918, which is hereby incorporated by reference in its entirety.

In operation, bolt 10 will be tightened with wrench 100 in compression gauge 1 until the desired pressure is obtained on gauge 14. Torque control valve 109 will be set to open at the line pressure used to achieve the desired pressure on gauge 14. Wrench 100 will then be used to tighten workpiece bolts (preferably identical to bolt 10) in a riser or other workpiece. By operating wrench 100 until wrench 100 torques out, the operator can ensure that the desired amount of compression is applied to each bolt. Where a transducer/transponder is provided, the amount of compression applied to each bolt may be monitored and records of the same may be easily created and maintained.

When compression gauge 1 is used in conjunction with the make up of a riser, it may be desirable to check each wrench 100 periodically to ensure that torque control valve 109 is still properly set. Most operators perform a compression test on the riser every five to ten joints. This is a convenient time to re-calibrate each wrench 100 against compression gauge 1. However, it will be appreciated that after each test of compression gauge 1, bolt 10 will have been securely tightened into receiver 9 such that significant torque will be required to remove it. This torque can be applied by converting wrench 100 to break out mode and simply loosening bolt 10. However, this is would be time consuming and may not be practical. As an alternative, stand 7 may be provided with a break-out wrench. Break-out wrench will preferably comprise a hammer wrench or slugging wrench configured to engage bolt 10 and an hydraulic cylinder configured to drive the hammer wrench. Suitable hammer wrenches include model number 53-4603360-5 inch AF, available from Armstrong Industrial Tool Co. of Chicago, Ill., a subsidiary of the Danaher Corporation. Any hydraulic cylinder suitable for working on the rig hydraulics and capable of applying forces in excess of those applied by wrench 100 will be sufficient. Prior to using compression gauge 1, the operator will engage bolt 10 with the hammer wrench and then drive the hammer wrench with the hydraulic cylinder until bolt 10 is loose.

It is anticipated that the many of the embodiments disclosed herein will be used in offshore environments. Therefore, the inventor contemplates manufacturing the piston and cylinder of stainless steel or other corrosion resistant materials and that corrosion resistant components will also be used While the invention has been described in terms of its preferred embodiment, other embodiments will be apparent to those of skill in the art from a review of the foregoing. Those embodiments as well as the preferred embodiments are intended to be encompassed by the scope and spirit of the following claims.

I claim:

1. A method of tightening a workpiece bolt to a desired degree of compression utilizing a compression gauge comprising an hydraulic cylinder and a piston slidably disposed in said cylinder, said cylinder and said piston defining an hydraulic chamber, said cylinder and said piston containing an aperture;
   a threaded female receiving member positioned on one side of said compression gauge and aligned with said aperture;
   a test bolt having a head end and a threaded body, wherein said head end of said test bolt is positioned on a side of said compression gauge opposite said female receiving member, wherein said test bolt body is positioned in said aperture, and wherein said test bolt body is configured to rotationally engage said threaded female receiving member, whereby tightening said test bolt will force said piston toward said cylinder, compressing said hydraulic chamber; and
   a pressure gauge in fluid communication with said hydraulic chamber; wherein the method comprises:
   tightening said test bolt with an hydraulic wrench, said hydraulic wrench comprising an hydraulic cylinder operating on a line pressure and a torque control valve configured to control the line pressure available to said hydraulic cylinder;
   continuing to tighten said test bolt with said hydraulic wrench until a desired pressure, corresponding to a desired degree of compression, is obtained on said pressure gauge;
   setting said torque control valve to open at the line pressure at which said hydraulic wrench was operating when said desired pressure was achieved in said pressure gauge; and
   tightening said workpiece bolt with said hydraulic wrench until said torque control valve opens.

2. A method of tightening a workpiece bolt to a desired degree of compression according to claim 1 wherein said hydraulic wrench further comprises a second pressure gauge configured to read said line pressure, said second pressure gauge having an output.

3. A method of tightening a workpiece bolt to a desired degree of compression according to claim 2 wherein said hydraulic wrench further comprises a transducer and a transponder.

4. A method of tightening a workpiece bolt to a desired degree of compression according to claim 3 further comprising converting said output of said second pressure gauge to a machine readable format.

5. A method of tightening a workpiece bolt to a desired degree of compression according to claim 4 further comprising transmitting said converted output of said second pressure gauge to a remote location.

6. A method of tightening a workpiece bolt according to claim 1 wherein said method further comprises incrementally adjusting said torque control valve to incrementally increase the amount of line pressure available to the hydraulic wrench until said desired pressure is obtained in said pressure gauge.

* * * * *